United States Patent [19]

Loucks

[11] 4,194,160
[45] Mar. 18, 1980

[54] NONINTERACTIVE HEATER POWER SUPPLY

[75] Inventor: Richard S. Loucks, Northridge, Calif.

[73] Assignee: International Telephone and Telegraph Corporation, New York, N.Y.

[21] Appl. No.: 830,067

[22] Filed: Sep. 2, 1977

[51] Int. Cl.² .......................... H03K 3/42; H05B 9/06
[52] U.S. Cl. .............................. 328/267; 307/296 A; 307/240; 323/18; 219/10.55 B; 307/311
[58] Field of Search ................ 328/267, 207; 307/296; 323/18, 311; 219/10.55

[56] References Cited
U.S. PATENT DOCUMENTS

| | | | |
|---|---|---|---|
| 4,005,370 | 1/1977 | Kusunoki et al. | 328/267 |
| 4,023,004 | 5/1977 | Burke | 323/18 |

*Primary Examiner*—Stanley D. Miller, Jr.
*Assistant Examiner*—B. P. Davis
*Attorney, Agent, or Firm*—William T. O'Neil

[57] ABSTRACT

A high efficiency regulated heater power supply which avoids the interactive effects of varying magnetic field around the heater on tube operating parameters. The technique employed is to "chop" the low frequency (typically, 60 Hz) supply at a high frequency 10 kHz, for example, rate. Regulation is accomplished by sensing RMS voltage across the heater (filament) and adjusting the "chopping" duty cycle to maintain constant RMS heater voltage. The aforementioned magnetic field effects are prevented by synchronizing the "chopping" frequency with the tube pulse rate, such that the tube heater (filament) is actually deenergized and operating on thermal inertia only during tube pulsed operation.

11 Claims, 3 Drawing Figures

LEGEND:

⏚ GROUND AC (FRAME)

⏚ GROUND FLOATING AT H.V.

NONINTERACTIVE HEATER POWER SUPPLY

BACKGROUND OF THE INVENTION

1. Field of the Invention

The invention relates generally to regulated alternating current power supplies and, more particularly, to applications where the load is sensitive to AC field interactive effects.

2. Description of the Prior Art

In the prior art, the regulation of alternating current supplies has been accomplished in a number of ways. Where regulator response time requirements were not particularly stringent, electromechanical devices were widely used. Typical of such electromechanical devices is the motor-driven variable ratio transformer or autotransformer. Other approaches included the so-called saturable reactor regulator and other species generally characterized as magnetic amplifier regulators.

The advent of power-handling solid state devices such as Thyristors and power transistors has made possible the regulation of alternating current sources by means of controllable series elements, such regulators resembling more closely the familiar series regulators extensively used for the regulation of DC power in vacuum tube equipment.

Still other devices employing such expedients as non-linear resistors, compression-controlled carbon piles, and many others, are also extant in the prior art, viewed broadly.

A particular problem exists in the heater (filament) power supply for pulsed microwave power tubes, such as amplitrons, magnetrons and the now familiar traveling wave tube. In radar systems known in the prior art, traveling wave tube heaters (filaments) have frequently been operated on DC in order to avoid or greatly reduce the problem of magnetic field interaction around the heater as it affects tube operating parameters. Such DC supplies are relatively large, heavy and complex equipments, especially if the residual AC ripple is to be carefully filtered.

The manner in which the present invention overcomes the disadvantages of the prior art in applications of the character described, will be fully described as this description proceeds, and additional advantages will also be evident therefrom.

SUMMARY

The invention has broad applicability in the field of AC voltage regulation since it employs a low dissipation arrangement and inexpensive sensing and control components. It is particularly useful in the control of heater (filament) voltage in pulsed thermionic devices where the duty cycle of operation of the device is relatively low.

In radar applications where microwave generators and amplifiers (such as the aforementioned amplitrons, magnetrons, traveling wave tubes and the like) are pulsed (switched on) periodically at a system repetition rate with the pulse or on-time being short compared to the interpulse period, a very unique concept of the invention becomes applicable. This unique concept, which is in fact only one novel aspect of the invention, involves complete interruption of the filament current of the thermionic device or other utilization device during the pulsed (on-time) period. In a typical radar system, this on-time may be only a fraction of a microsecond, out of hundreds or thousands of microseconds. Even in systems where there is intrapulse frequency modulation, coding or frequency hopping, the total individual transmitter pulse on-time generally does not exceed a value on the order of a few hundred microseconds out of any interpulse period of 2,000 microseconds or more. In that situation, the thermal inertia of the filament assembly is sufficient to provide unimpaired operation with the heater current completely cut-off for the duration of the transmitted pulse.

In the combination of the present invention, the AC supply to the thermionic device filament is "chopped" (modulated or interrupted) by a series of pulses at a relatively high frequency rate compared to the power source frequency. Typically, the said relatively high frequency may be on the order of 10 kHz, whereas the power source frequency is typically 60 Hz. Obviously, true RMS value of the heater current so modulated is less than the pure sine wave of the source; however, this is easily accounted for by setting the unmodulated AC supply appropriately higher so that the nominal "chopping" or modulation provides the desired true RMS value.

The apparatus provides for pulse width modulation of the individual "chopping" pulses supplied at the aforementioned relatively high frequency. Thus, a sensor which develops an analog of the true RMS value of the "chopped" AC supply can be used to control this modulation pulse wave form duration and thereby vary the aforementioned true RMS value of the voltage extant across the heater (filament) terminals. A regulator feedback loop is thus established with very economical circuitry, the details of which will be evident as this description proceeds.

By synchronizing the chopping frequency with the radar system pulse repetition frequency, it is possible to place a chopper pulse contemporaneous with each transmitter pulse. Obviously, this can be accomplished by placing a chopper pulse which is at least as long in duration as a transmitter pulse as a synchronously overlaid pulse enclosing each transmitter pulse. Accordingly, the interruption of the AC current through the heater is accomplished at the critical time, and therefore, the interactive magnetic fields are eliminated. In systems wherein the transmitter pulse period is not regular, the device of the invention is automatically adapted to accommodate that situation, as will be described hereinafter.

The aforementioned and other aspects of the present invention will be evident as this description proceeds. It may be said to have been the general objective of the present invention to provide a simple and lightweight alternating current regulator for the applications of the character described, said regulator further providing for the elimination of interactive magnetic fields in the heater (filament) vicinity in short-duty-cycle pulsed applications.

DESCRIPTION OF THE PREFERRED EMBODIMENT

Figure 1:
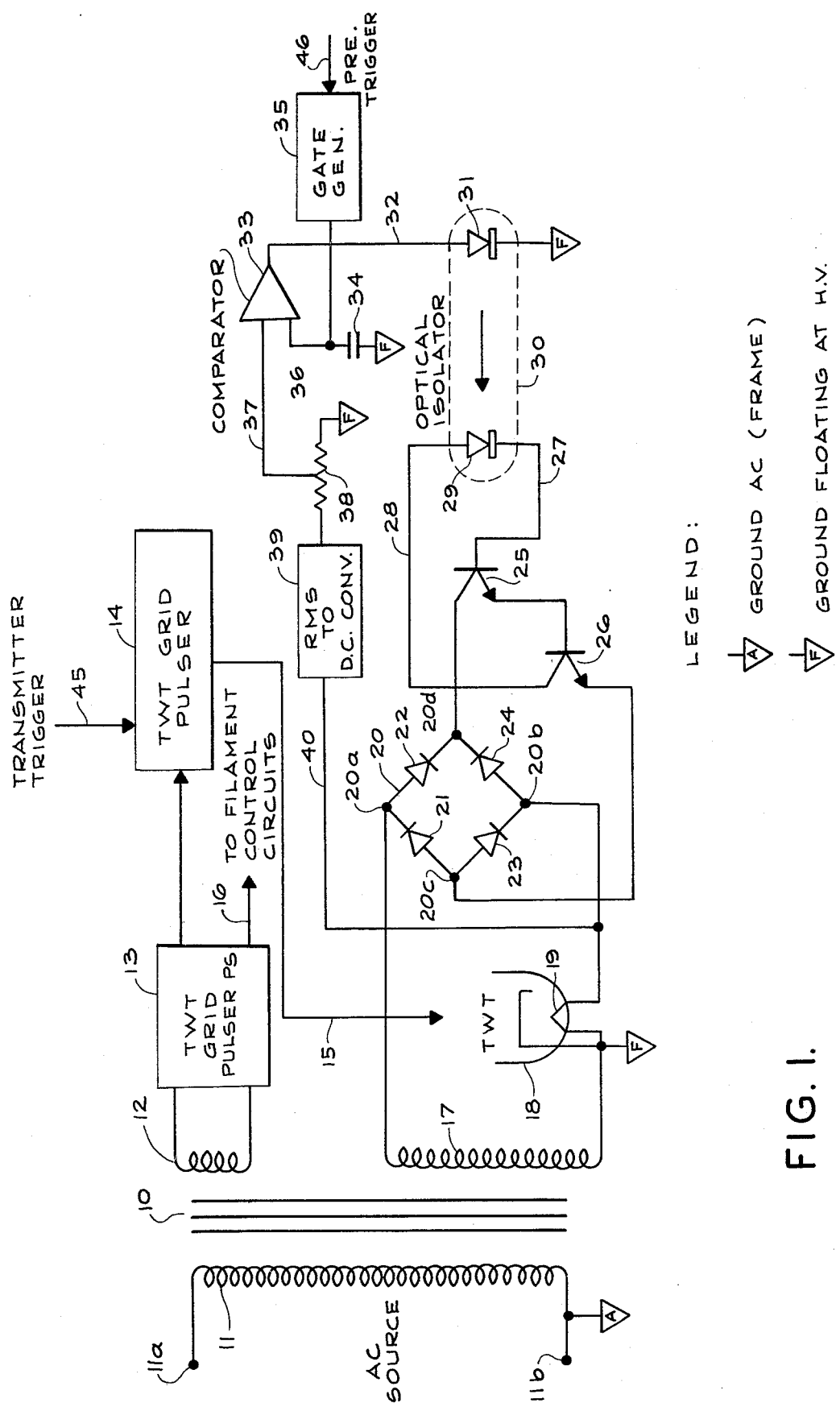
FIG. 1 is a schematic block diagram according to the invention.

Referring now to FIG. 1, a typical implementation according to the invention is depicted. As is common with such devices as shown in FIG. 1, a power transformer generally at 10 is employed, having a primary winding 11 with terminals 11a and 11b. Two secondary windings 12 and 17 are shown, the winding 17 supplying an AC voltage slightly higher than the rated voltage required by the heater (filament) of the thermionic device to be energized. This is because of the reduction in true RMS value resulting from the AC waveform chopping hereinbefore described and to be more fully described hereinafter.

As previously indicated, the apparatus of the present invention is not limited to microwave generators and amplifiers such as the indicated traveling wave tubes, magnetrons, amplitrons and the like, but the invention is typically useful with those microwave tubes because they are parameter affected in response to the magnetic fields generated by AC excitation of their heaters (filaments).

FIG. 1 is a typically illustrated and will be described, assuming that the microwave tube used is a traveling wave tube 18. While it has been indicated that more cumbersome and expensive prior art DC filament supplies have been used with traveling wave tube systems and the like in the past in order to eliminate or greatly reduce the alternating magnetic field around the filament, it has been observed that traveling wave tube life is longer with an AC filament supply than with DC. This is believed to be because of the lower rate of gun structure contamination when an AC supply is used. Since the present invention is obviously an AC filament supply arrangement, this factor is to be noted as an additional advantage accruing to the present invention.

It will be seen that the transformer winding 17 acts as an AC supply for the traveling wave tube heater (or filament) 19 through the diode bridge 20. This bridge is essentially a four-terminal device, the terminals 20a and 20b comprising a first pair and the terminals 20c and 20d comprising a second pair of terminals. If it is assumed for the moment that there is no conductive path between 20c and 20d, then the conductive path between 20a and 20b is likewise blocked or open. This is because the diodes 21 and 23 are in series opposing and the same may be said of diodes 22 and 24 so that neither the positive nor negative half cycle of the AC supplied by the winding 17 is able to pass. If it is now assumed that a direct connection or short circuit is applied between 20c and 20d, then the bridge will be seen to be fully conductive in that the positive half cycle AC wave extant at 20a "passes" through diode 22, via the short circuit to 20c, and thence through 23 to terminal 20b. Similarly, the negative half cycle when extant at 20a "passes" through diode 21, and thence via the short circuit to terminal 20d and finally through diode 24 to terminal 20b.

The transistors 25 and 26 are of a type capable of carrying substantial currents, these two acting together as a current switch or variable current device in response to gates applied via leads 27 and 28.

At this point, based on the assumption that the thermionic device 18 is a traveling wave tube, the traveling wave tube grid pulser 14 is shown and a pulsing lead 15 is depicted. When appropriately pulsed in accordance with known apparatus (not shown) in response to the transmitter trigger on 45, the traveling wave tube 18 operates, for example, as a high-power microwave amplifier. The system contemplated, being a high-powered, pulsed radar system with relatively low duty cycle, an environment for the device of the invention is provided. The traveling wave tube grid pulser power supply 13, supplied from an AC winding 12, is to be understood to provide DC power to the grid pulser 14; and also by a lead 16, some DC power necessary to enable the filament control circuit, which includes the comparator 33 and gate generator 35, is provided.

It has already been indicated that the AC supply to the filament 19, typically at 60 Hz, is modulated by a much higher frequency chopping signal (i.e., on the order of 10 kHz or more). The sample of this modulated 60 Hz AC wave, taken on lead 40, is converted in 39 to a DC signal as a function of the true RMS value of this composite wave on 40. Since the RMS current in any electrically heated element is the independent variable determining the temperature thereof, and since a stable operating temperature filament 19 is contemplated during operation, it then follows that resistance of 19 reaches a predetermined stable value during operation. From that observation, it follows that the RMS voltage on 40 is an appropriate independent variable descriptive of the temperature of 19. A true RMS converter, such as 39, is a device well known in this art, and since thermal circuits generally are slow-acting, high bandwidth (or, stated otherwise, rapid response) of 39 is not a requirement. The output of 39 to a variable adjustment 38 allows the signal thereon to be fractionated appropriately at 37, this facilitating empirical adjustment of the system based on observed performance. This adjustment may be thought of as a loop-gain adjustment providing a relatively steady DC signal on 37 which comparator 33 uses to generate a gate beginning substantially at the pre-trigger 46 and terminating at a point in time determined by the coincidence of the value on 37 with a sawtooth signal on 36 produced from gate 35 by integration in capacitor 34. Quite obviously, the larger the value of 37, the longer the time after gate initiation before it is terminated. As this description proceeds, it will be seen that this gate signal is extant on 32 and is transferred through an optical isolator 30, through the current controlling circuit comprising transistors 25 and 26 and thence into the bridge 20.

Figure 2:
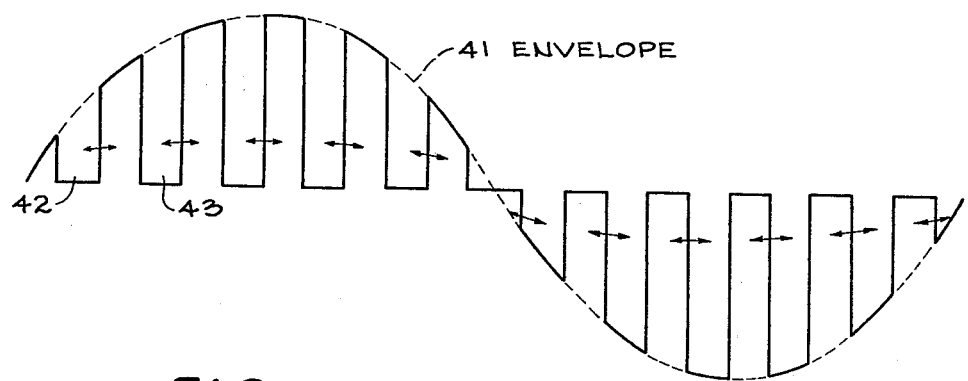
FIG. 2 is a waveform diagram depicting the basic AC filament excitation envelope with superimposed "chopper" modulation according to the invention.
Figure 3:
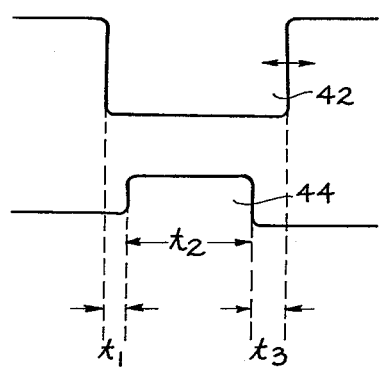
FIG. 3 is a waveform diagram depicting a typical time relationship between a chopper modulation gate and a transmitter pulse.

To understand the foregoing circuit operation more clearly, reference is made to FIG. 2. In FIG. 2, the envelope of the typical 60 Hz AC wave 41 from transformer windings 17 is shown keyed or chopped (modulated) by a cut-off gate having a variable trailing edge. In one particular system, the repetition rate of the transmitted pulses was on the order of 2,000 cycles, and the transmitted pulse was on the order of 60 microseconds in duration. Considering the variable trailing edge pulses, typically 42 and 43 illustrated in FIG. 2, it will be realized that only every nth of these pulses corresponds to a transmitted pulse, although all of the variable trailing edge chopper pulses illustrated in FIG. 2 are effective in controlling the effective or true RMS voltage. Thus, there are n times as many chopper pulses as transmitted pulses, but it is to be understood that each nth chopper pulse is contemporaneous with (synchronous with) a transmitted pulse in a manner illustrated in FIG. 3. The pre-trigger at 46 serves to provide a settle-down time $t_1$, as previously indicated. Thus, if it is assumed that chopper pulse 42 of FIGS. 2 and 3 is one which corresponds to the time of a transmitter pulse 44, then these time relationships are as depicted on FIG. 3. The pulse time $t_2$ is, of course, the transmitted pulse duration, and $t_3$ is the trailing edge overlap. The system parameters would be arranged in such a way that $t_3$ would never be less than zero (i.e., the trailing edge of 44 would never be farther ahead in time than the trailing edge of 42). This is a mechanism by which the filament 19 is deenergized through the action of each of the chopper pulses depicted in FIG. 2, notwithstanding the fact that only every nth pulse corresponds in time to a transmitted pulse as depicted in FIG. 3. Stated otherwise, it follows that the chopper pulse repetition frequency is the integral multiple of the radar system pulse repetition frequency. Therefore, the pre-trigger at lead 46 will be understood to have a frequency n times that of the transmitter trigger at 45.

At this point in the description, it should be pointed out that the conveyance of the modulating gates (or chopper gates) to the variable current-switching device comprising transistors 25 and 26 may be accomplished in various ways. In FIG. 1, the use of an optical isolator is depicted. This isolator 30 comprises a light energy transmitter, such as the familiar LED (light-emitting diode) 31. This LED is optically coupled into a light-transmitting medium, for example, a fiber optic conductor to a photodiode 29. An expedient such as this provides for the imposition of the modulating (or chopper) gates onto the common mode voltages which will be seen to be extant on leads 27 and 28 by virtue of its existence of the bridge 20. Optical isolator arrangements, such as 30, are frequently used where the common mode voltage to be rejected or "bridged" is a high voltage, since the fiber optic or other optical transmitting medium is inherently a high quality insulator electrically. Although this optical isolator 30 is illustrated in FIG. 1, it will be recognized by those skilled in this art that, in view of the lower common mode voltages involved, other means in lieu of 30 can be substituted. One of these might be a pulse transformer coupling arrangement, for example.

The foregoing description has assumed that the transmitter interpulse period is regular and therefore predictable. In certain systems the interpulse period may be programmed from a signal processor and changed as a function of scan angle or some other consideration. The PRF (and, therefore, the period between transmitter pulses) is, therefore, variable and even random in some systems. In such nonregular pulsing situations, a prior synchronism between transmitter and chopper gates is not possible. However, the gate generator 35 will respond to the transmitted pulse to produce an irregular chopper gate at the appropriate time. The gate circuit 35 would be, in that event, a free-running gate generator which is time re-referenced with each trigger on 46. The same gate duration modulation as previously described continues as described for the regulation function of the device.

It will be noted that on FIG. 1 two types of ground or common connections are depicted, namely, those to the frame or ordinary "earth" grounds, the other grounds represented being those floating at the high voltage applied to the traveling wave tube in accordance with its operating requirements. Those grounds represented by a ground symbol with the letter "f" therein are "floating" at this high common mode voltage. The transformer 10 serves as an overall common mode isolating means in this instance. Numerous modifications in the variations on the specific circuitry required to practice the present invention will suggest themselves to those skilled in this art. Accordingly, it is not intended that the scope of the invention should be regarded as limited to the drawings of this description, these being intended to be typical and illustrative only.

What is claimed is:

1. An AC power supply regulation system with means for eliminating AC magnetic field interactive effects during a predetermined relatively small time period, comprising:

an alternating current source connected to energize a heatable element the temperature of which is to be stabilized;

first means for sensing the RMS AC voltage applied to said element and for converting said RMS voltage to an analog signal as a function of the true RMS value of said AC voltage;

second means connected in the current path between said source and said element, said second means comprising a circuit responsive to chopping control signals for cyclically interrupting the current through said element;

and third means responsive to said analog signal and to external synchronizing signals for generating said chopping control signals as variable time duration gates of repetition frequency high compared to the frequency of said AC voltage, said chopping control signals being applied to said second means in a sense tending to stabilize the true RMS value of the resulting chopped AC current flowing through said element.

2. A filament power supply regulation system for a pulsed thermionic device, comprising:

a source providing alternating current of a voltage suitable for filament supply for said thermionic device, said device being inherently subject to interactive effects due to alternating magnetic fields produced by alternating filament current;

a modulating circuit associated with said source and said filament, said circuit having a control input and being arranged to control its conductivity in response to a modulation signal at said control input;

first means for sensing the true RMS voltage applied to said filament from said source and for generating a series of modulating gates of repetition frequency high compared to the frequency of said AC source, each of said gates being of a duration which is a variable inverse function of said true RMS voltage, said first means being also responsive to external synchronizing signals to time predetermined gates of said series to be contemporaneous with predetermined pulse times of said thermionic devices;

and second means for applying said series of gates to said modulating circuit control input in a sense such that said predetermined gates operate to produce instantaneous current cut-off in said filament causing said filament to operate on thermal inertia during said predetermined pulse times and to provide feedback stabilization of said true RMS voltage.

3. Apparatus according to claim 1 in which said third means external synchronizing signals in a series are periodic and are timed to identify a corresponding periodic series of intervals during which said chopping control signals are in a cyclical condition interrupting said current through said element, the magnetic field effects of current from said AC source being thereby eliminated during said series of intervals.

4. Apparatus according to claim 2 further defined in that said modulating circuit comprises a four-terminal diode bridge having a first pair of opposite terminals thereof in series with said source and said filament, said bridge being variably conductive between said opposite terminals of said first pair as a function of the conductivity between the second pair of opposite bridge terminals, said conductivity being controlled by said modulating gates of said first means.

5. Apparatus according to claim 4 in which said synchronizing signals to which said first means is responsive are trigger signals preceeding each transmitter pulser trigger by a predetermined amount to allow a settle-down time for said magnetic fields prior to the beginning time of said transmitter pulse, the minimum time duration of said gates generated by said first means being sufficient to extend at least to the end of said transmitter pulse.

6. Apparatus according to claim 5 in which said first means comprises means for generating said gates which is responsive to the value of said true RMS voltage to determine said gate duration as a function thereof.

7. Apparatus according to claim 2 in which said first means includes solid state variable current-carrying means responsive to said modulating gates, said current-carrying means being connected to said modulating circuit control input.

8. Apparatus according to claim 4 in which said first means includes solid state variable current-carrying means responsive to said modulating gates, said current-carrying means being connected to carry current between the terminals of said second pair of opposite bridge terminals, said current-carrying means being controlled to substantially zero conductivity during said modulating gates and otherwise providing a predetermined maximum conductivity, said bridge thereby producing said filament current cut-off contemporaneously.

9. Apparatus according to claim 6 in which said first means includes solid state variable current-carrying means responsive to said modulating gates, said current-carrying means being connected to carry current between the terminals of said second pair of opposite bridge terminals, said current-carrying means being controlled to substantially zero conductivity during said modulating gates and otherwise providing a predetermined maximum conductivity, said bridge thereby producing said filament current cut-off contemporaneously.

10. Apparatus according to claim 8 in which said first means includes optical-electric coupling means for coupling said modulating gates to said variable current-carrying means, thereby to isolate the first means gate generating circuits from the common mode AC voltage extant at said bridge second terminal pair.

11. Apparatus according to claim 2 in which said first means for generating a series of modulating gates is a free running gate generator responsive to said external synchronizing signals to be substantially synchronized to insure said contemporaneous of said predetermined gates irrespective of nonuniform interpulse periods of said pulse times.

* * * * *